Aug. 4, 1959  R. T. DOUGHTY  2,898,063
RESILIENT SUPPORT
Filed Oct. 25, 1954

INVENTOR
Robert T. Doughty
BY
S. C. Thorpe
ATTORNEY

United States Patent Office 2,898,063
Patented Aug. 4, 1959

2,898,063
RESILIENT SUPPORT

Robert T. Doughty, Detroit, Mich., assignor to General Motors Corporation, Detroit, Mich., a corporation of Delaware Application October 25, 1954, Serial No. 464,439

1 Claim. (Cl. 248—9)

This invention relates to resilient supports; more particularly it relates to resilient means constituting a connection between a supporting and supported structure, at least one of which is subject to vibration; and with regard to certain more specific features to a resilient support intended to be used in supporting an internal combustion engine which has inherent vibration qualities within the frame of a motor vehicle.

The support as illustrated is interposed between the rear end portion of a vehicle motor and transmission housing and the frame or body of the vehicle in which situation the support is especially adapted to prevent vibration and torsional reactions of the motor from being transmitted to the vehicle body while at the same time isolating the engine housing from twisting or weaving of the vehicle frame.

Among the principal objects of the invention are to provide an improved resilient mounting of the character mentioned having directional stability; to provide a resilient support of the character mentioned having improved variable rate characteristics for the purpose of obtaining optimum vibration dampening effect; to provide a resilient support having improved life; and further and more specifically, to provide a relatively simple resilient mounting for the rear end of an internal combustion engine which is economical, easy to assemble and use, and efficient in use, and which improves the riding qualities of the motor vehicle and contributes to the comfort of the passengers thereof by reducing the amount of engine vibration transmitted to the vehicle frames and bodies.

These and other objects of the invention will be more thoroughly understood from the following description of a preferred embodiment thereof in which reference is made to the attached drawings, in which.

Figure 1:
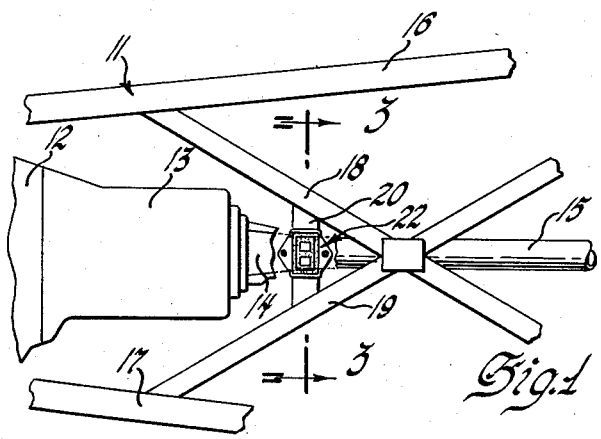
Figure 1 is a plan view of the rear mounting of a motor housing on a vehicle frame with portions of the housing broken away to show a resilient support or mounting constructed in accordance with the present invention.

Referring to the drawings, Figure 1 shows a conventional internal combustion automotive power plant or train which is supported by the frame of a motor vehicle. The power train comprises an engine 12, a transmission unit 13, a transmission output shaft 14, and a driven propeller shaft 15, which are represented diagrammatically by the housing components for these individual units as shown from left to right in Figure 1. The housing components for the engine, transmission, and output shaft are each secured to the adjacent housing component to form, in effect, a single rigid housing unit, hereinafter designated by the term "engine" or "motor." The frame 11 comprises two longitudinally extending side members 16 and 17 interconnected by X-type cross members 18 and 19. A secondary cross member 20 extending transversely of the vehicle interconnects the forward legs of the cross members 18 and 19, and a resilient mounting or support 22 interposed between the cross member 20 and the output shaft housing 14 supports the rear of the engine on the frame. The mounting 22 is constructed to oppose vibratory movement of the engine in all directions and also to yieldably oppose torque reactions and bound and rebound of the engine due to vehicle acceleration and deceleration. The engine is adapted to be mounted on the vehicle frame at its forward end, not shown, by conventional two-point resilient vibration dampening mountings, also not shown.

Figure 2:
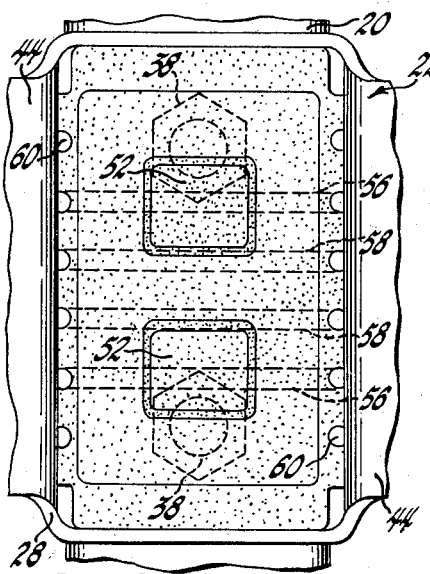
Figure 2 is an enlarged fragmentary view of that portion of Figure 1 showing the support.
Figure 3:
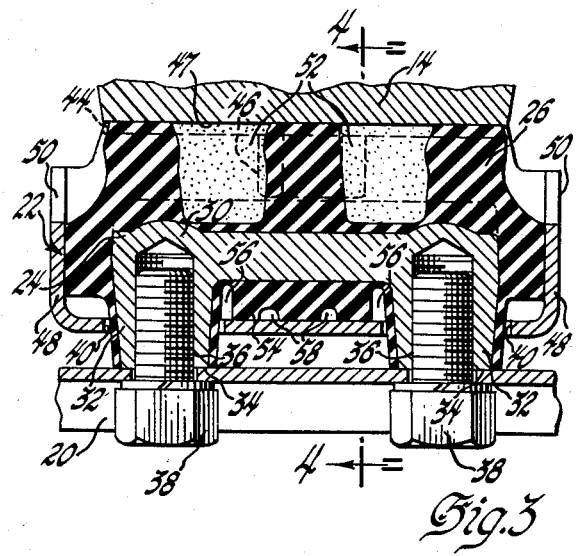
Figure 3 is a sectional view taken substantially on the line 3—3 of Figure 1.
Figure 4:
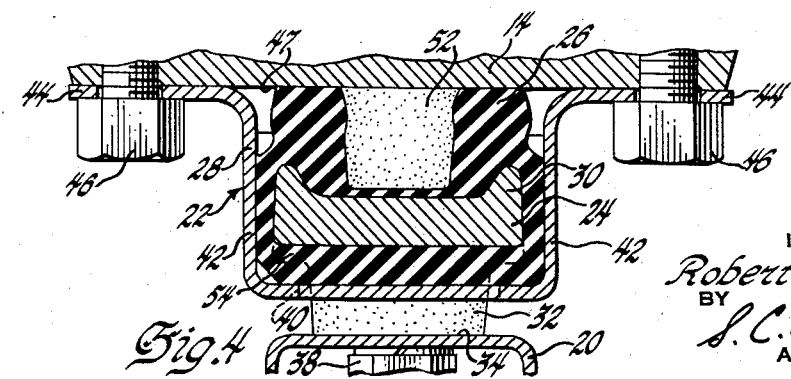
Figure 4 is a sectional view taken substantially on the line 4—4 of Figure 3.

The details of the resilient rear support 22 are shown in Figures 2 to 4. The resilient support 22 comprises a metal core structure 24 connectable to the cross member 20, a block or body of resilient composition 26 enveloping said core and bonded thereto, and a rectangular box-like metal cage or retainer casing 28 enclosing the rubber body and secured to the vehicle frame. The upper portion 30 of the metal core is in the form of an upwardly facing shallow channel extending transversely of the vehicle and having a fore-and-aft width substantially greater than its vertical depth. The metal core is formed with downwardly extending bosses 32, 32 which are rectangular in section with their major dimension parallel to the longitudinal axis of the vehicle which is in the direction extending transversely of the core. The end faces 34, 34 of the bosses 32, 32 are each provided with threaded openings 36, 36 adapted to receive bolts 38, 38 by which the core is secured to the cross member 20.

As indicated above, the metal casing 28 of the mounting is of substantially rectangular box-like form. The top of the casing is open and the bottom thereof is provided with two substantially rectangular openings 40, 40 for spacedly embracing the downwardly extending bosses of the core structure. The fore-and-aft side walls 42, 42 of the casing 30 at their upper margins are provided with oppositely extending apertured flanges 44, 44 which are secured to the flat under side 47 of the output shaft housing 14 by bolts 46, 46. The upper margins of the end side walls 48, 48 of the retainer casing are cut away as indicated at 50, 50 to provide air circulation about the resilient body 26 as discussed in greater detail below.

The resilient block or body 26 of the mounting completely encases all of the core 24 except the end faces of the bosses 32, 32 and has a plurality of laterally extending portions compressively interposed between the surfaces of the core and the opposing surfaces of the casing and of the output shaft housing. The proportions of these laterally extending portions of the resilient body with respect to the core are necessarily dependent on the vibration dampening application to which the invention is applied. In the instant application, the portion of the resilient body 26 extending upwardly from the core 24, as shown in Figures 3 and 4, is relatively thick and is provided with two rectangularly shaped recesses 52, 52 which constitute closed air spaces when the upper portion of the resilient body abuts the under surface of the output shaft housing.

On its bottom, the body 26 is provided with a centrally disposed rib 54 which projects downwardly from the core 24 and extends transversely of the mounting and longitudinally of the vehicle between the bosses 32, 32. The height of this rib is approximately half that of the bosses on the core 24. The space between the portion of the body enveloping the bosses 32 and the rib 54 form, in effect, two relatively deep grooves 56, 56 extending transversely of the mounting. The bottom of the rib also has two relatively shallow parallel grooves 58, 58 formed therein. As shown, the grooves 58, 58 open on and dissect the surface of rib engaging the bottom of the casing 28 into three parallel casing-engaging lands or bosses extending transversely of the mounting parallel to the grooves 56, 56.

The portions of the resilient body interposed between the end faces of the core and the end walls of the casing 28 are of substantially the same thickness as the height of the rib 54 interposed between the core and the bottom of the casing while the portions of the resilient body interposed between the lateral faces of the core and the side walls 42, 42 of the casing are relatively thin in comparison with the other portions of the body. These last-mentioned lateral portions of the resilient body have a plurality of parallel grooves 60 formed therein which extend vertically and open on and dissect the surfaces of these lateral portions into a plurality of parallel lands or bosses compressively engaging the fore-and-aft side walls 42, 42 of the casing 28. Four of these grooves, two on each side of the resilient block, are interconnected by the grooves 58 formed on the bottom of the rib 54; and four of the grooves 60, two on each side of the block, are interconnected by the grooves 56. It will be noted that the margins of the resilient block or body 26 are cut away tending to isolate the upper portion from the lateral and end portions of the body, the end portions from the lateral portions, and the bottom rib 54 from the lateral portions. This cutting away of the margins of the rubber body also serves to accommodate displacement of the rubber under load within the confines of the casing and further serves, in conjunction with the grooves 56, 58 and 60, and the cut-away end portions 50, 50 of the casing, to permit the circulation of air about the resilient body within the casing.

The inside dimensions of the casing are slightly smaller than the overall dimensions of the rubber body 26 so that the latter, when assembled and installed between the housing member 14 and the frame cross member 20, is under normal compressive stress in vertical, transverse, and longitudinal directions. The arrangement is such that vertical, fore-and-aft, and lateral vibrations of the engine are yieldably opposed by the resistance of the portions of the resilient body in line with such vibratory loadings to additional compressive stress, and by the shearing stresses resulting from the flexing of the other portions of the resilient body between the casing and the core. If the shearing stress in the flexing portions of the body exceeds a determinate maximum, the core and the rubber body will slide relative to the casing. This sliding movement will be resisted by the compressive frictional engagement between the casing and the surfaces of the flexing portions. Such sliding movement is, of course, relatively small and in no case can it exceed the clearance between the openings 40 and the bosses 32. When such vibrations exceed the determinate amplitude, the surfaces of that flexed portion of the body which is subjected to shear stress will slide upon the surface of the casing with the result that a divided dampening of the vibration is effected.

With the above described mounting structure, the following advantages are obtained: The grooves 56 and 58 in the bottom rebound rib 54 cause air to be pumped through the end walls of the casing and around the mount inside the casing through the cut away margins and the grooves 60 thereby dissipating the heat induced in the resilient body by the cyclic flexing and compressing of the various body portions. This dissipation of heat results in increased resiliency life of the body by reducing the operating temperatures thereof. The grooves in the bottom rebound rib 55 also reduces the initial rate of the rib, permitting the mount to hit softer and allowing the initial vibratory loads to build up slower. The grooves in the lateral portions of the resilient body, in addition to their air circulating functions, result in a relatively low initial spring rate permitting the use of a harder, less resilient body material without increasing the transmission of engine torque vibration to the vehicle frame, and further permitting the use of a tighter fit in the retainer cage without affecting the ease of assembly. The tighter fit with lower initial rate permits the rubber to flex instead of sliding during lateral vibration of the mount, thereby reducing abrasion and giving longer life, and the use of a harder body material also increases the resistance to abrasion.

While only one specific embodiment of the invention has been shown and described for the purposes of illustrating the use of such a mount in a motor vehicle, it will be appreciated that various minor modifications may be made in adapting this invention for use in other machines without departing from the spirit and scope of the invention as defined in the following claim.

I claim:

In a resilient mounting adapted to be interposed between two relatively movable members, said mounting comprising a core element attachable to one of said relatively movable members, a casing attachable to the other of said relatively movable members and disposed about said core in spaced relation thereto, and a resilient body member enveloping said core and having portions thereof compressively interposed and extending between opposed surfaces of said core and said casing for resiliently opposing relative vibratory movement therebetween, the outer faces of said resilient portions being maintained in compressive frictional engagement with the surfaces of said casing, the improvement comprising: two opposite portions of said body member extending laterally from opposite sides of said core having a plurality of substantially parallel grooves formed therein, said grooves opening on the casing-engaging faces of each of said opposite portions and dividing said opposite portions into a plurality of parallel bosses, a further portion of said body between said two opposite portions having substantially parallel passages therein extending transversely of the body and interconnecting the respective ends of said grooves in said two opposite portions at one end thereof, and recessed portions in said body intercepting the opposite ends of said grooves, said casing having a part thereof cut away to provide communication between said recessed portions and the atmosphere without said casing whereby vibratory movement of said members flexing and compressing said opposite portions causes alternate expansion and contraction of said grooves thereby inducing and circulating cooling air through said grooves and said parallel passages.

References Cited in the file of this patent
UNITED STATES PATENTS

| | | |
|---|---|---|
| 2,215,743 | Saurer | Sept. 24, 1940 |
| 2,332,264 | Saurer | Oct. 19, 1943 |
| 2,621,876 | Else | Dec. 16, 1952 |